UNITED STATES PATENT OFFICE.

ALBERT BUSCH, OF ELBERFELD, GERMANY, ASSIGNOR TO ANILINÖL-FABRIK A. WÜLFING, OF SAME PLACE.

PHARMACEUTICAL COMPOUND AND PROCESS OF MAKING SAME.

SPECIFICATION forming part of Letters Patent No. 621,791, dated March 28, 1899.

Application filed December 31, 1897. Serial No. 665,174. (No specimens.)

*To all whom it may concern:*

Be it known that I, ALBERT BUSCH, doctor of philosophy, a subject of the Duke of Brunswick, residing at Elberfeld, in the Kingdom of Prussia, Germany, have invented new and useful Improvements in Processes of Preparing Ferro-Albuminous Compounds, of which the following is a specification.

This invention relates to a process of producing ferro-albuminous compounds.

If a solution of albumen—as, for example, the white of an egg—is mixed with a solution of an iron-salt of the nitrosophenols, nitrosonaphtols, or of the sulfo-acids derived from the latter and the resulting mixture is heated with addition of acetic acid in order to coagulate the albumen, a certain quantity of the ferro-nitroso compound is taken up and retained. In the resulting ferro-albuminous compounds the ferro-nitroso compound can be abstracted from the coagulated albumen neither by means of water, nor by means of a diluted acid, even if a slight heating takes place; but by using alkaline liquids the ferro-albuminous compounds are dissociated at a temperature corresponding to the heat of the human body.

The new compounds possess a certain number of qualities which make them very valuable for medicinal purposes.

In contradistinction to the ferro-albuminous bodies which are extracted from the blood and which possess an insipid taste the new substances have neither savor nor odor, and their quality of being easily dissolved in alkaline liquids makes them very fit to be assimilated when taken into the intestines, while the iron in the new compounds is so combined that its presence cannot be detected by using the normal reagents.

The new compounds are unaffected by hydrochloric acid or by the alkaline sulfides.

A mode of preparation of the ferro-albuminous compounds is the following: About one-fifth of a pound (one hundred grams) of albumen (egg-white) is diluted in about a quart (one liter) of cold water, and thereafter warm water is added until the temperature of the liquid is 113° Fahrenheit, (45° Celsius.) The mass is stirred until the albumen is completely dissolved. A hot concentrated solution is also made of about one-half ounce (fifteen grams) napthtol-green (iron and sodium salt of nitroso-$\beta$-naphthol sulfo-acid) or one-half ounce (fifteen grams) solid-green, (ferrodinitroso-resorcin salt of the sodium,) and thereafter the albumen solution is mixed with the solution of the ferro-nitroso compound, the mixture is heated to about 140° to 158° Fahrenheit, (60° to 70° Celsius,) and there is added thereto one-fortieth of a quart (twenty-five cubic centimeters) of acetic acid of fifty per cent., which results in a flocky precipitate. This precipitate is separated from the liquid, compressed, and added to one and one-half quarts (1.5 liter) boiling water, and after the material has become cold the same is filtered and the solid matter compressed and dried at a low temperature.

Of course the quantity of the ferro-nitroso compound which combines with the albumen can be varied for the sake of obtaining a product containing more or less iron. By using the above proportions of the components the ferronitroso compounds are very nearly absorbed by the albumen, so that the body obtained after the filtration has taken place is but slightly colored. By using a small quantity of the ferro-nitroso body the result and product is not colored at all.

Having thus described my invention, I declare that what I claim, and desire to secure by Letters Patent, is—

1. The herein-described process of obtaining ferro-albuminous compounds which consists in treating an albuminous substance with an iron salt of a nitroso derivative of benzene, and coagulating said albuminous substance whereby it takes up and retains said benzene derivative.

2. The herein-described process of obtaining ferro-albuminous compounds which consists in mixing a hot concentrated solution of naphthol green with a solution of an albuminous substance, heating the mixture, and precipitating the product with an acid.

3. The herein-described ferro albuminous compounds derived from albumen, and iron salts of the nitroso derivatives of benzene, having the iron intimately bound with the albumen, the proportion of iron being variable with the quantity of iron salt used, said compounds being odorless and tasteless, colorless when the quantity of iron salt used is small enough to be entirely absorbed by the albumen, easily soluble in alkaline liquids, and unaffected by hydrochloric acid or by the alkaline sulfids.

In testimony whereof I have signed my name to this specification in the presence of two subscribing witnesses.

ALBERT BUSCH.

Witnesses:
R. E. JAHN,
OTTO KÖNIG.